United States Patent
Tsai et al.

(10) Patent No.: US 7,765,710 B2
(45) Date of Patent: Aug. 3, 2010

(54) APPARATUS AND METHOD FOR MEASURING DIAMETER OF HOLE

(75) Inventors: Chih-Chien Tsai, Taipei Hsien (TW); Su-Der Wu, Taipei Hsien (TW); Yu-Chieh Liao, Taipei Hsien (TW); Chau-Lin Chang, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 5 days.

(21) Appl. No.: 12/184,209

(22) Filed: Jul. 31, 2008

(65) Prior Publication Data
US 2009/0249635 A1 Oct. 8, 2009

(30) Foreign Application Priority Data
Apr. 3, 2008 (CN) .................. 2008 1 0300829

(51) Int. Cl.
*G01B 5/12* (2006.01)
(52) U.S. Cl. .................. 33/542; 33/558.01; 33/784
(58) Field of Classification Search ........... 33/542–544, 33/544.1–544.6, 534, 538, 555.1–555.3, 33/558.01–558.04, 558.2, 558.4, 558.5, 501.09, 33/501.1, 501.3, 501.5, 783, 784, 793, 794, 33/797–799, 813, 815, 827, 831
See application file for complete search history.

(56) References Cited

U.S. PATENT DOCUMENTS

| | | | | |
|---|---|---|---|---|
| 3,962,792 A | * | 6/1976 | Stepanek et al. | 33/501.04 |
| 4,231,158 A | * | 11/1980 | Possati | 33/501.04 |
| 5,092,056 A | * | 3/1992 | Deaton | 33/544 |
| 5,548,900 A | * | 8/1996 | Hunt-Grubbe | 33/302 |
| 5,875,561 A | * | 3/1999 | Chen et al. | 33/784 |
| 6,497,051 B1 | * | 12/2002 | Poole et al. | 33/784 |
| 6,560,889 B1 | * | 5/2003 | Lechen | 33/544.3 |
| 6,574,582 B1 | * | 6/2003 | Geiger | 702/162 |
| 7,076,886 B2 | * | 7/2006 | John et al. | 33/784 |

FOREIGN PATENT DOCUMENTS

CN 2314341 Y 4/1999

\* cited by examiner

*Primary Examiner*—Amy Cohen Johnson
(74) *Attorney, Agent, or Firm*—Zhigang Ma

(57) ABSTRACT

A measuring apparatus is provided for measuring a diameter of a hole. The measuring apparatus includes a sensor unit, a data processing unit, and a display unit. The sensor unit includes a probing member. The probing member includes a plurality of probes with contact ends being arranged on a circumference, and a plurality of angle sensors. The probes are capable of contacting the inner surface of the hole. The angle sensors are arranged on each of the probes to obtain digitally an angle value of each splaying probe contacting the inner surface of the hole. The data processing unit is configured for receiving the angle value generated by the sensor unit and computing the diameter of the hole according to the value of an angle. The display unit is configured for displaying the diameter computed by the data processing unit. A method is also provided for using the measuring apparatus.

7 Claims, 5 Drawing Sheets

APPARATUS AND METHOD FOR MEASURING DIAMETER OF HOLE

BACKGROUND

1. Field of the Invention

The present invention relates to an apparatus and a method for measuring a diameter of a hole.

2. Description of Related Art

Traditionally, a vernier caliper is normally used for measuring the diameter of a hole. Two measuring claws of the vernier caliper are inserted into the hole touching the inner surface of the hole. Thus the value of the diameter of the hole can be read from the vernier caliper.

Generally, a measured diameter from the vernier caliper is smaller than the actual diameter of the hole.

DETAILED DESCRIPTION

Figure 1:
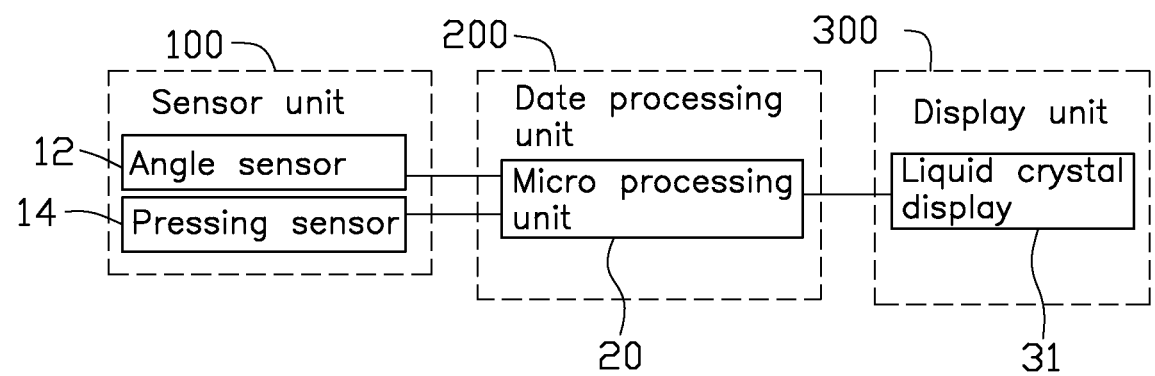
FIG. 1 is a block diagram of a measuring apparatus for measuring a diameter of a hole in accordance with an embodiment of the present invention.

Referring to FIG. 1, in an embodiment of the present invention, a measuring apparatus for measuring an inside diameter of a hole of an object includes a sensor unit 100, a data processing unit 200, and a display unit 300.

Figure 2:
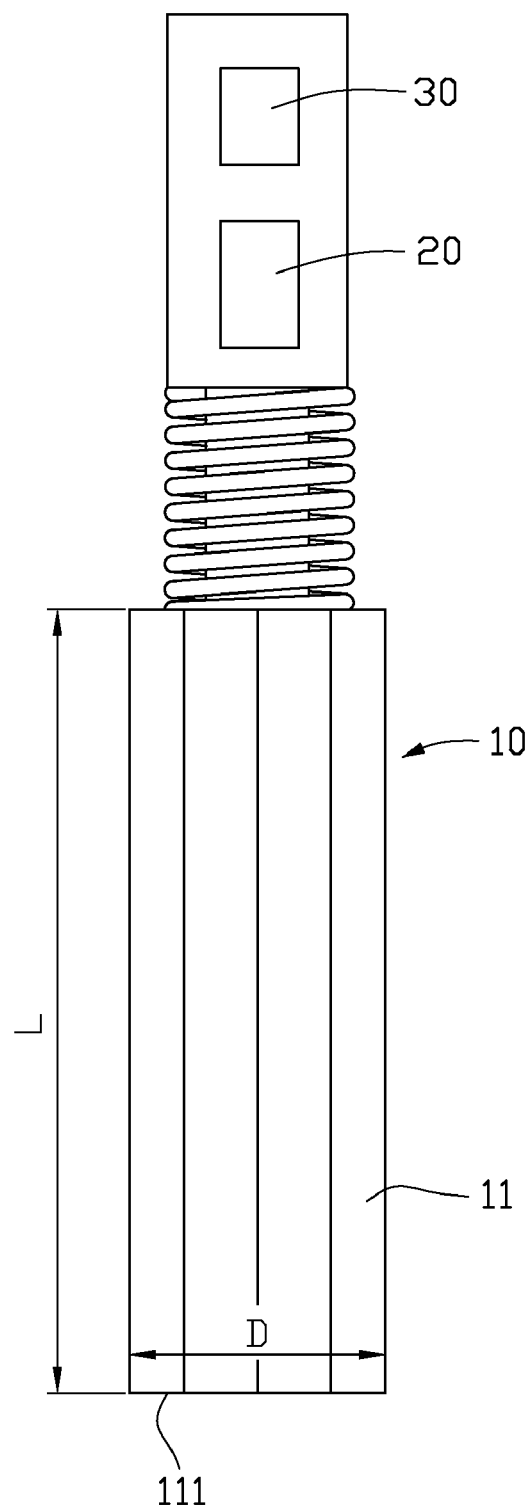
FIG. 2 is an isometric view of the measuring apparatus of FIG. 1.
Figure 2A:
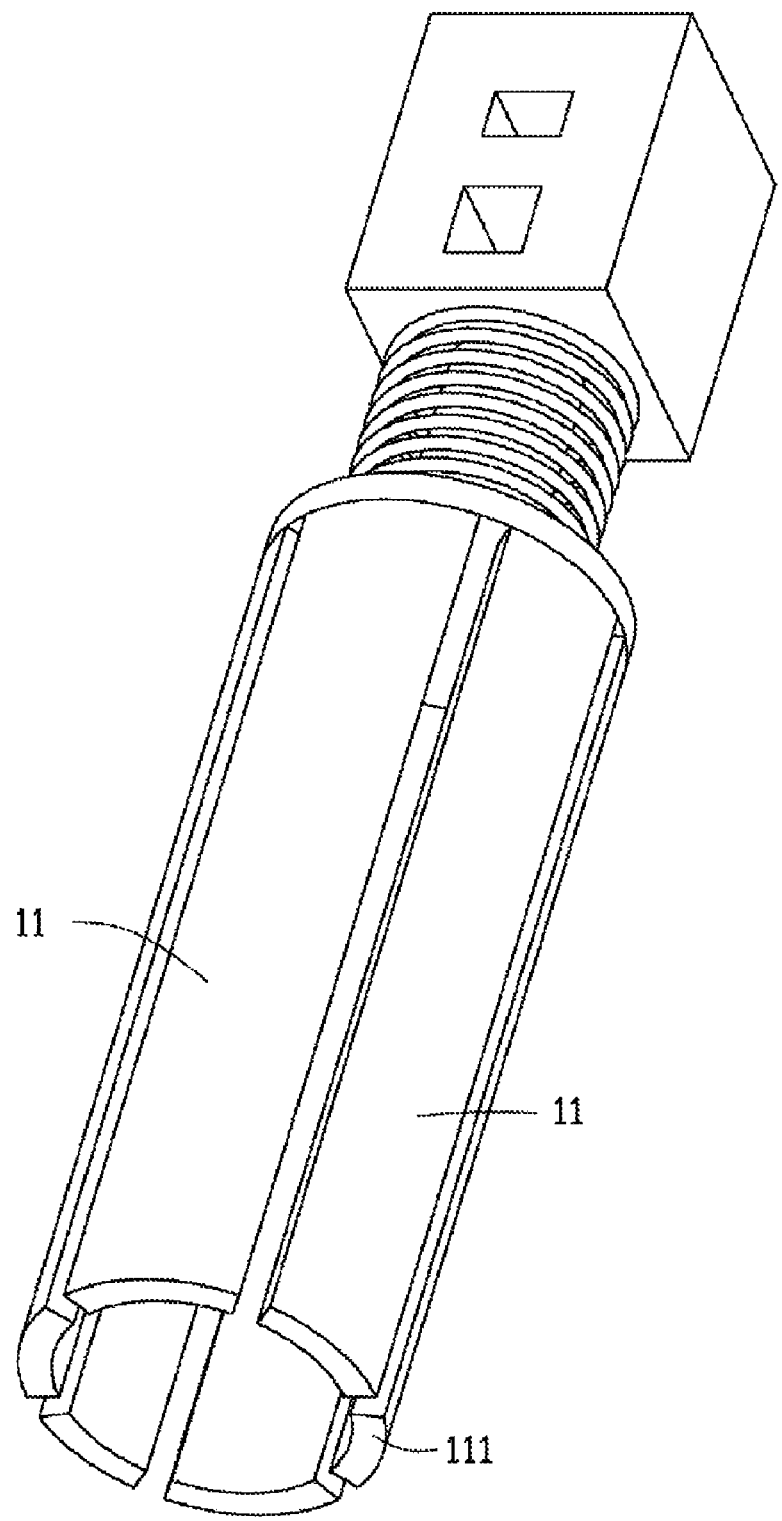
FIG. 2A is similar to FIG. 2, but viewed from another perspective.
Figure 3:
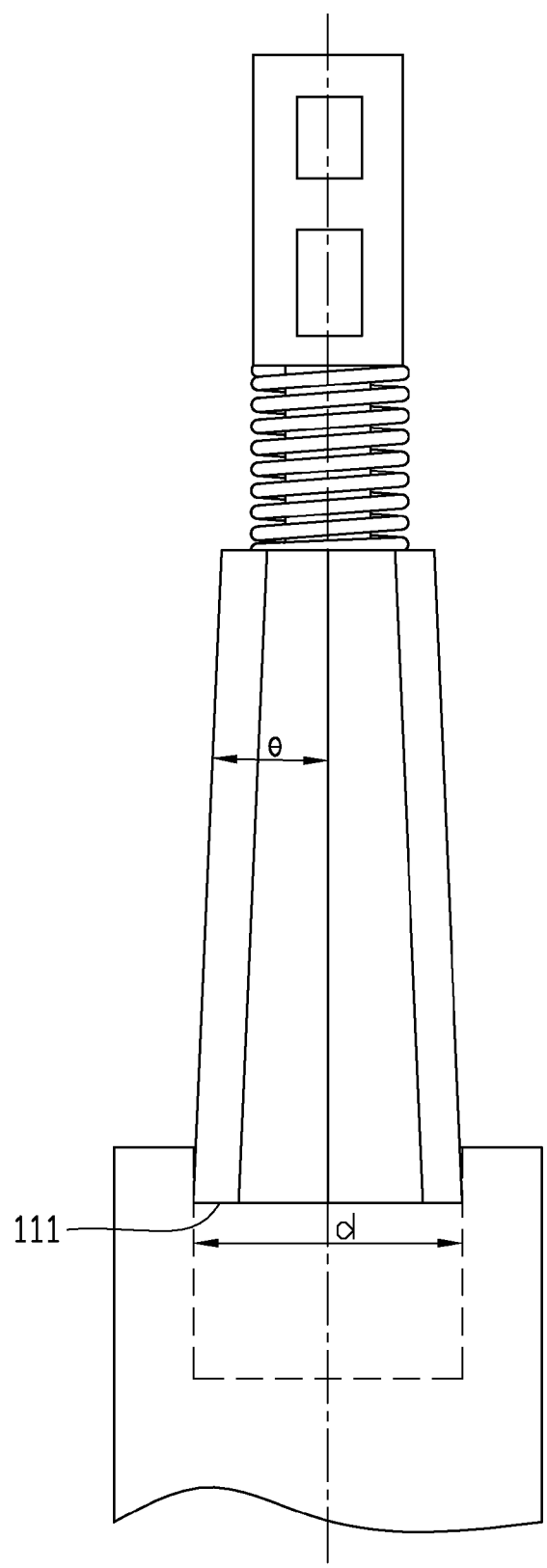
FIG. 3 is similar to FIG. 2, but showing the measuring apparatus of FIG. 1 in use.

Referring also to FIGS. 2, 2A and 3, the sensor unit 100 includes a probing member 10. The probing member 10 is cylindrical in shape, and includes a plurality of elongated probes 11. The length of each of the probes 11 is equal to L. The probes 11 are aligned uniformly around the cylindrical axis of the probing member 10 with the longitudinal direction of each of the probes 11 parallel the cylindrical axis of the probing member 10 in an initial position. The probes 11 are capable of being inserted into a to-be-measured hole substantially along an axis of the to-be-measured hole when they are collapsed to the initial position. Each of the probes 11 includes a contact end 111 at a distal end thereof. The contact ends 111 of the probes 11 for contacting the inner surface of the hole of the object are arranged on a circumference whose diameter is D. When measuring the hole, the probes 11 splay conically so that the contact end 111 of each probe 11 contacts an inner surface of the to-be-measured hole. When the probes 11 splay, each of the probe 11 slants at an angle $\theta$ relative to the cylindrical axis. An angle sensor 12 is arranged on each of the probes 11 to measure the angle digitally, and sends the angle value to the data processing unit 200.

The data processing unit 200 is used for processing the angle value to compute the diameter of the to-be-measured hole. If a letter "d" is used for representing the diameter of the to-be-measured hole, then, $d = D + 2L \sin \theta$. The data processing unit 200 adopts a micro processing unit 20 to compute the diameter in this embodiment.

The display unit 300 is used for displaying a measured result received from the data processing unit 200. The display unit 300 includes a liquid crystal display 31 in this embodiment.

A pressure sensor 14 is mounted to the contact end 111 of each of the probes 11. The pressing sensors 14 are used for sensing whether the probes 11 come into contact with the inner surface of the to-be-measured hole correspondingly, and generating contact signals to the data processing unit 200 when the probes 11 contact the inner surface of the to-be-measured hole.

The probes 11 may splay cylindrically uniformly to attain the same angles relative the inner surface of the to-be-measured hole. If the to-be-measured hole has a perfect cylindrical surface, thereby having a prefect circle cross section, each and every of the probes 11 are capable of contacting the inner surface of the to-be-measured hole. If the to-be-measured hole does not have a prefect circle cross section, some of the plurality of probes 11 would come into contact with the inner surface of the to-be-measured hole, while the other of the plurality of probes 11 would not. In this case, the measured diameter equals to the diameter of the inscribed circle of the to-be-measured hole.

As another embodiment of the present invention, the probes 11 may splay cylindrically at varying angles. Even though the to-be-measured hole does not have a perfect cylindrical surface, all the probes 11 are capable of contacting the inner surface of the to-be-measured hole. The angles $\theta$ generated by the probes 11 are not equal. The data processing unit 200 is capable of computing the largest diameter according to the largest angle, the smallest diameter according to the smallest angle, and a average diameter according to an average value of all the angles.

Figure 4:
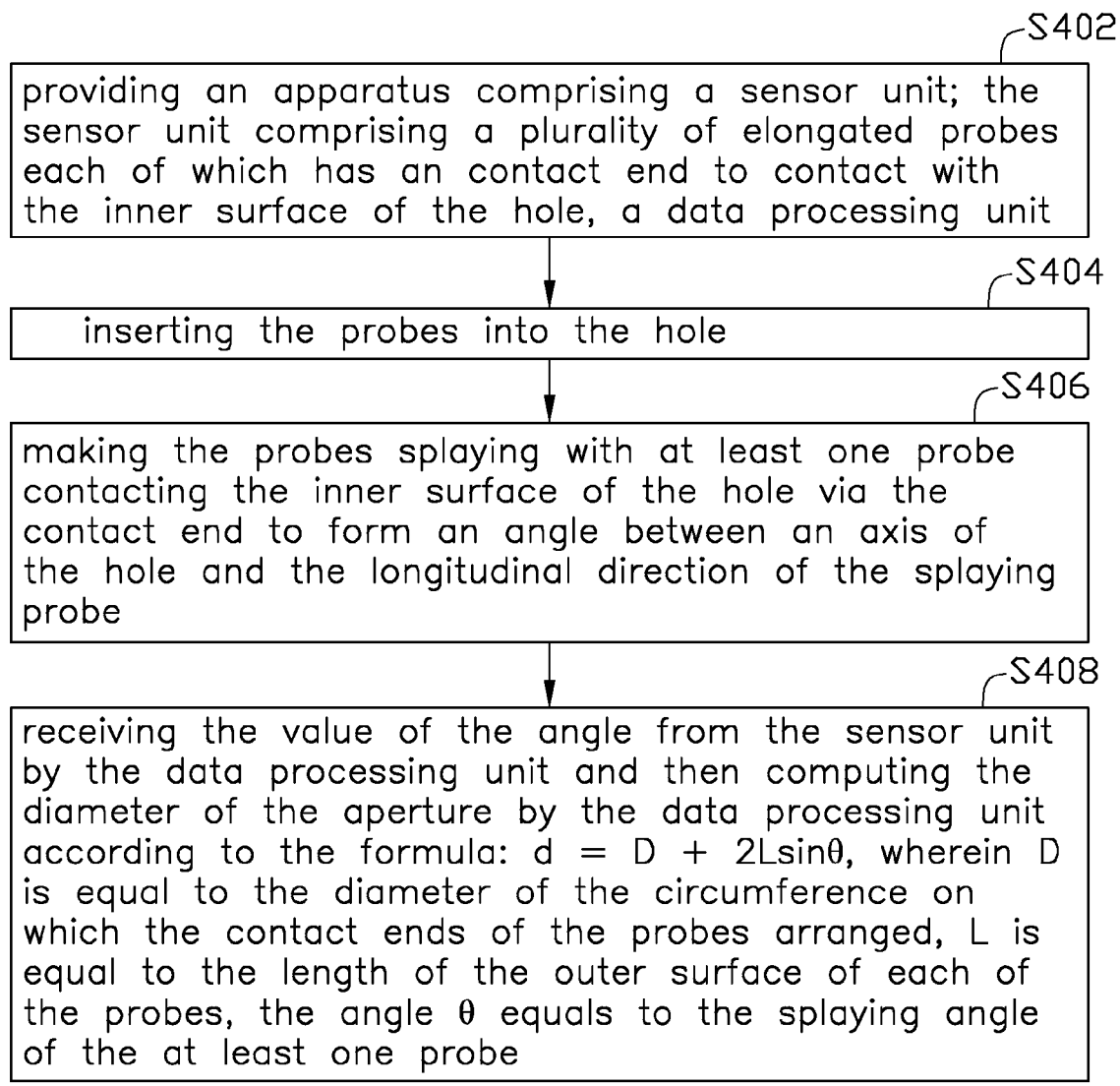
FIG. 4 is a flowchart of a method for measuring a diameter of a hole in accordance with another embodiment of the present invention.

A flowchart of a method for measuring a diameter of a to-be-measured hole according to the above-mentioned measuring apparatus is shown in FIG. 4. The method includes the steps of:

Step S402, after the apparatus is powered on, the liquid crystal display 30 of the display unit 300 is initialized. The probes 11 are collapsed.

Step S404, an object defining the to-be-measured hole to be measured is placed on a flat with the axis of the to-be-measured hole being perpendicular to the flat.

Step S406, the probing member 10 is inserted into the to-be-measured hole of the object with the probes 11 thereof being perpendicular to the flat.

Step S408, each of the probes 11 splays to contact the inner surface of the to-be-measured hole to obtain angle $\theta$ value digitally via the angle sensor 12.

Step S410, the data processing unit 200 receives the angle $\theta$ value from each of the probes 11, and then computes the diameter of the to-be-measured hole via the formula: $d = D + 2L \sin \theta$.

Step S412, the result d is displayed on the display unit 300.

While several embodiments have been disclosed, it is understood that any element disclosed in any one embodiment is easily adapted to other embodiments. It is also to be understood, however, that even though numerous characteristics and advantages of the present invention have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A measuring apparatus for measuring a diameter of a hole, comprising:
   a sensor unit comprising:
   a probing member comprising a plurality of inextensible probes, each probe having a contact end arranged on a circumference, the probes being capable of contacting an inner surface of the hole via the contact ends in a splaying manner; and
   a plurality of angle sensors corresponding to the plurality of the probes, each angle sensor being arranged on one of the probes to obtain digitally an angle value of each splaying probe contacting the inner surface of the hole;
   a data processing unit electrically connected to the sensor unit, configured for receiving the angle value generated by the sensor unit and computing the diameter of the hole according to the value of an angle; and
   a display unit electrically connected to the data processing unit, configured for displaying the diameter of the hole computed by the data processing unit.

2. The measuring apparatus as described in claim 1, wherein the probes are capable of being inserted into the hole substantially along an axis of the hole when they are collapsed to an initial position, and capable of splaying to contact the inner surface of the hole with contact ends; the splaying angle of each of the probes is defined between the splaying position and the initial position.

3. The measuring apparatus as described in claim 2, wherein the data processing unit is capable of computing the diameter d of the hole according to the formula: $d = D + 2L \sin \theta$, wherein D is equal to the diameter of the circumference on which the contact ends of the probes arranged, L is equal to the length of an outer surface of each of the probes, the angle $\theta$ is equals to the splaying angle of each of the probes.

4. The measuring apparatus as described in claim 1, wherein the probes are capable of coordinately splaying with some of the plurality of probes contacting the inner surface of the hole while the other of the plurality of probes not, the splaying angles generated by the probes are equal, the measured diameter of the hole is a diameter of an inscribed circle of the hole.

5. The measuring apparatus as described in claim 1, wherein the probes are capable of non-symmetrically splaying with all the probes contacting the inner surface of the hole, the angles generated by the probes are not equal, the data processing unit is capable of computing a largest diameter according to a largest splaying angle of the probes, a smallest diameter according to a smallest splaying angle of the probes, and an average diameter according to all the splaying angles of the probes.

6. A method for measuring a diameter of a hole, comprising:
   providing an apparatus comprising a sensor unit; the sensor unit comprising a plurality of elongated and inextensible probes each of which has a contact end to contact with an inner surface of the hole, a data processing unit;
   inserting the probes into the hole;
   making the probes splaying with at least one probe contacting the inner surface of the hole via the contact end to form an angle between an axis of the hole and a longitudinal direction of the splaying probe; and
   receiving the value of the angle from the sensor unit by the data processing unit and then computing the diameter of the aperture by the data processing unit according to the formula: $d = D + 2L \sin \theta$, wherein D is equal to the diameter of the circumference on which the contact ends of the probes arranged, L is equal to the length of the outer surface of each of the probes, the angle $\theta$ equals to the splaying angle of the at least one probe.

7. The method as described in claim 6, further comprising displaying the calculated diameter by a display unit.

* * * * *